(12) United States Patent
Boyer

(10) Patent No.: US 11,884,102 B2
(45) Date of Patent: Jan. 30, 2024

(54) EXPANDABLE WHEEL

(71) Applicant: NIKKO TOYS LIMITED, Hong Kong (CN)

(72) Inventor: Jesse Boyer, Hong Kong (CN)

(73) Assignee: Nikko Toys Limited, Kowloon (HK)

( * ) Notice: Subject to any disclaimer, the term of this patent is extended or adjusted under 35 U.S.C. 154(b) by 0 days.

(21) Appl. No.: 17/927,807

(22) PCT Filed: Aug. 18, 2020

(86) PCT No.: PCT/CN2020/109755
§ 371 (c)(1),
(2) Date: Nov. 25, 2022

(87) PCT Pub. No.: WO2022/036546
PCT Pub. Date: Feb. 24, 2022

(65) Prior Publication Data
US 2023/0211632 A1  Jul. 6, 2023

(51) Int. Cl.
*B60B 19/04* (2006.01)
*A63H 17/26* (2006.01)

(52) U.S. Cl.
CPC .......... *B60B 19/04* (2013.01); *A63H 17/266* (2013.01); *B60B 2900/351* (2013.01); *B60B 2900/551* (2013.01)

(58) Field of Classification Search
CPC ... B60B 19/04; B60B 2900/351; B60B 15/06; B60B 15/10; B60B 15/22; A63H 17/00; A63H 17/004; A63H 17/26; A63H 17/266
See application file for complete search history.

(56) References Cited

U.S. PATENT DOCUMENTS 3,995,909 A * 12/1976 van der Lely .......... B60B 15/26
  301/47
4,601,519 A *  7/1986 D'Andrade ............ B60B 15/12
  301/41.1
(Continued)

FOREIGN PATENT DOCUMENTS

CN    102310710 A1    1/2012
CN    102328704 A1    1/2012
(Continued)

OTHER PUBLICATIONS

Lin, Xiuxia; International Search Report of the International Search Authority (CN National Intellectual Property Administration) for PCT/CN2020/109755.
(Continued)

*Primary Examiner* — Kip T Kotter
(74) *Attorney, Agent, or Firm* — Intellectual Property Consulting, LLC; Stephen M. Kepper

(57) ABSTRACT

An expandable wheel (100) assembly attached to a vehicle includes a circular rim disc (200) operable to receive a plurality of drive members (300) about its circumference. The drive members (300) are pivotally connected to the rim disc (200) and expand outward from the rim disc (200) via sliding levers (500) when a rotational force is applied to the rim disc (200). As a result, the drive members (300) increase the ground clearance and enhance the ability for the vehicle to negotiate variable terrain while also increasing the top velocity of the vehicle. The expandable wheel (100) assembly contracts to a circumferential closed position when the rotational force is removed.

13 Claims, 10 Drawing Sheets

(56) References Cited

U.S. PATENT DOCUMENTS

| | | | | |
|---|---|---|---|---|
| 11,014,402 B2* | 5/2021 | Fourdrinier | ............ | B60B 19/04 |
| 2013/0081885 A1* | 4/2013 | Connor | .................. | B60B 19/02 |
| | | | | 180/8.2 |
| 2014/0158439 A1* | 6/2014 | Kim | ..................... | B62D 57/028 |
| | | | | 901/1 |

FOREIGN PATENT DOCUMENTS

| | | |
|---|---|---|
| CN | 102350917 A1 | 2/2012 |
| CN | 104249599 A1 | 12/2014 |
| CN | 107804114 A1 | 3/2018 |
| KR | 101384826 B1 * | 4/2014 |
| WO | 2010087542 A1 | 8/2010 |

OTHER PUBLICATIONS

Lin, Xiuxia; Written Opinion of the International Search Authority (CN National Intellectual Property Administration) for PCT/CN2020/109755.

* cited by examiner

EXPANDABLE WHEEL

BACKGROUND OF THE INVENTION

I. Field of the Invention

The present invention relates generally to wheels. More specifically, the present invention relates to wheels which expand and contract in circumference.

II. General Background

Vehicles typically use fixed-diameter wheels for propulsion, which may limit performance and terrain negotiability. For example, fixed-diameter wheels are limited to a top velocity as based on the number of revolutions per time unit the axle or other drive mechanism can turn the wheel. Top velocity is determined by the wheel circumference for a given number of revolutions per time unit. Increasing effective wheel circumference increases the vehicle's top velocity for a particular drive mechanism.

Wheel diameter also limits the degree and type of terrain obstacles a vehicle may tolerate. Larger wheels typically provide more clearance between the vehicle's undercarriage and the terrain. Increased ground clearance allows the vehicle to negotiate uneven surfaces, bumps, holes, rocks and other obstacles which would otherwise cause the vehicle to "bottom out" or get stuck. Variable tread configurations such as knobby tires and deep tracks provides a claw effect which improves increases grip and allows the vehicle to overcome challenging terrain. It would be desirable for a wheel to have concentrically expandable members to provide the ability to negotiate extreme obstacles.

SUMMARY OF THE INVENTION

An expandable wheel is provided in accordance with embodiments of the invention. The expandable wheel includes a rim disc with a central aperture operable to receive an axle around which it may rotate. The rim disc has a plurality of rim disc channels which extend radially from the central aperture to the outer circumference. A plurality of drive member apertures is disposed around the outer circumference of the rim disc.

A plurality of drive members is provided. Each drive member includes a drive member head, a drive member pivot aperture and a drive member sliding lever aperture. Each drive member is pivotally connected to a rim disc drive member aperture via a pin.

A sliding lever disc is provided and defines a central aperture operable to receive an axle around which it may rotate. The sliding lever disc defines a plurality of sliding lever channels extending radially from the central aperture with inner ends and outer ends.

A plurality of sliding levers is provided. Each sliding lever has a sliding end opposite a drive member end. A sliding lever channel pin is disposed at the sliding end of each sliding lever. A drive member pin is disposed at the drive member end of each sliding lever. Each sliding lever channel pin is disposed within a rim disc channel and a sliding lever disc channel. Each sliding lever drive member pin is disposed within a drive member sliding lever aperture. As a result, each drive member is slidably connected to a rim disc channel and a sliding lever disc channel via a sliding lever. When a rotational force is applied to the sliding lever disc, the sliding lever channel pins travel from the drive ends of the rim disc channels and sliding lever channels to the axle ends of the rim disc channels and sliding lever channels to pivot the drive members to move from a contracted position to an expanded position. When the wheel is at rest, the sliding lever channel pins return to the drive ends of the rim disc channels and sliding lever channels such that the drive members return to a contracted position.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

Figure 1:
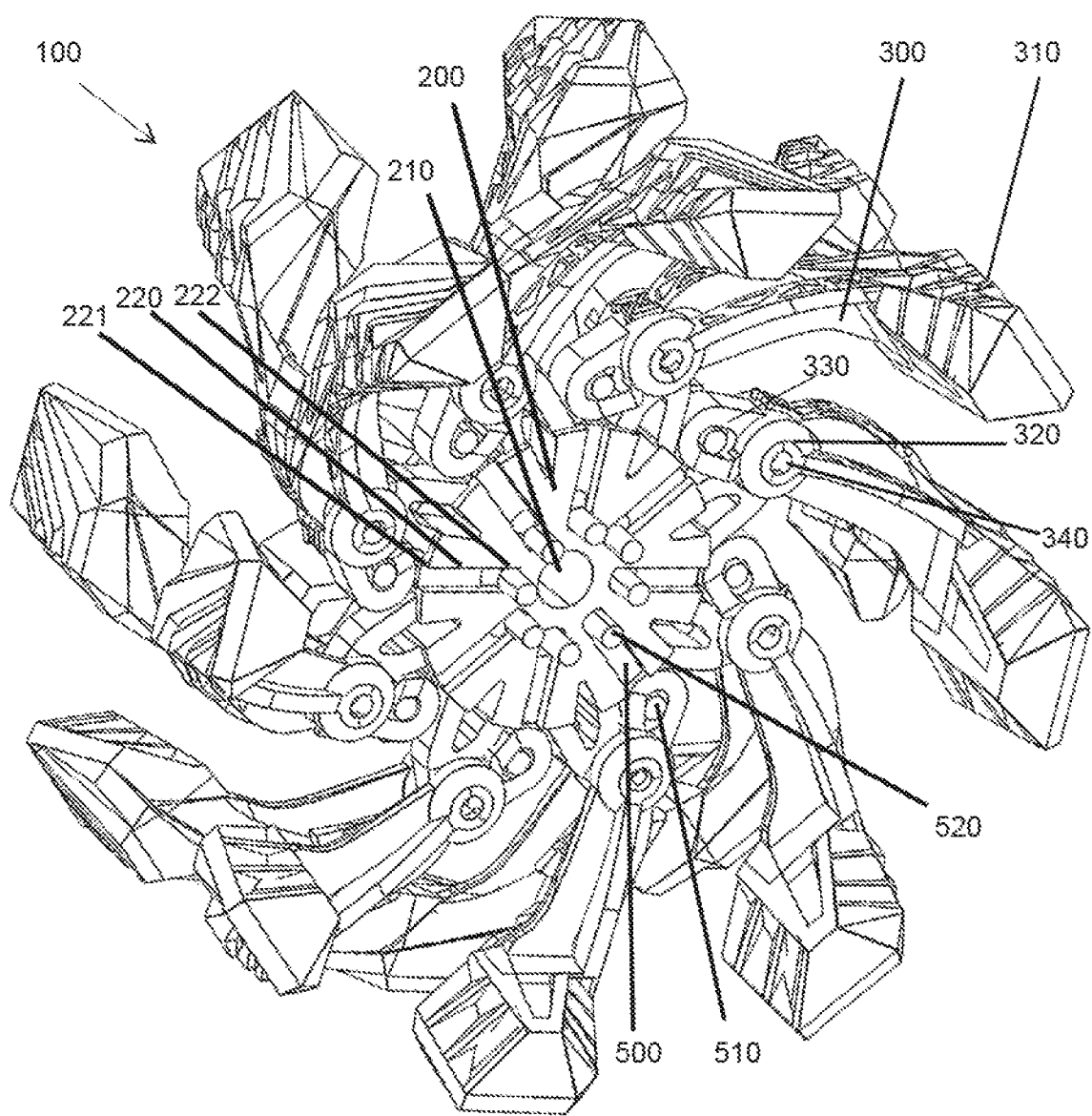
FIG. 1 is a perspective view of the inside of an expandable wheel in the expanded position without sliding lever disc 400 attached in accordance with embodiments disclosed herein.

The images in the drawings are simplified for illustrative purposes and are not depicted to scale. Within the descriptions of the figures, similar elements are provided similar names and reference numerals as those of the previous figure(s). The specific numerals assigned to the elements are provided solely to aid in the description and are not meant to imply any limitations (structural or functional) on the invention.

The appended drawings illustrate exemplary configurations of the invention and, as such, should not be considered as limiting the scope of the invention that may admit to other equally effective configurations. It is contemplated that features of one configuration may be beneficially incorporated in other configurations without further recitation.

DETAILED DESCRIPTION

The embodiments of the disclosure will be best understood by reference to the drawings, wherein like parts are designated by like numerals throughout. It will be readily understood that the components, as generally described and illustrated in the Figures herein, could be arranged and designed in a wide variety of different configurations or be entirely separate. Thus, the following more detailed description of the embodiments of the system and method of the disclosure, as represented in the Figures is not intended to limit the scope of the disclosure, as claimed, but is merely representative of possible embodiments of the disclosure.

Figure 2:
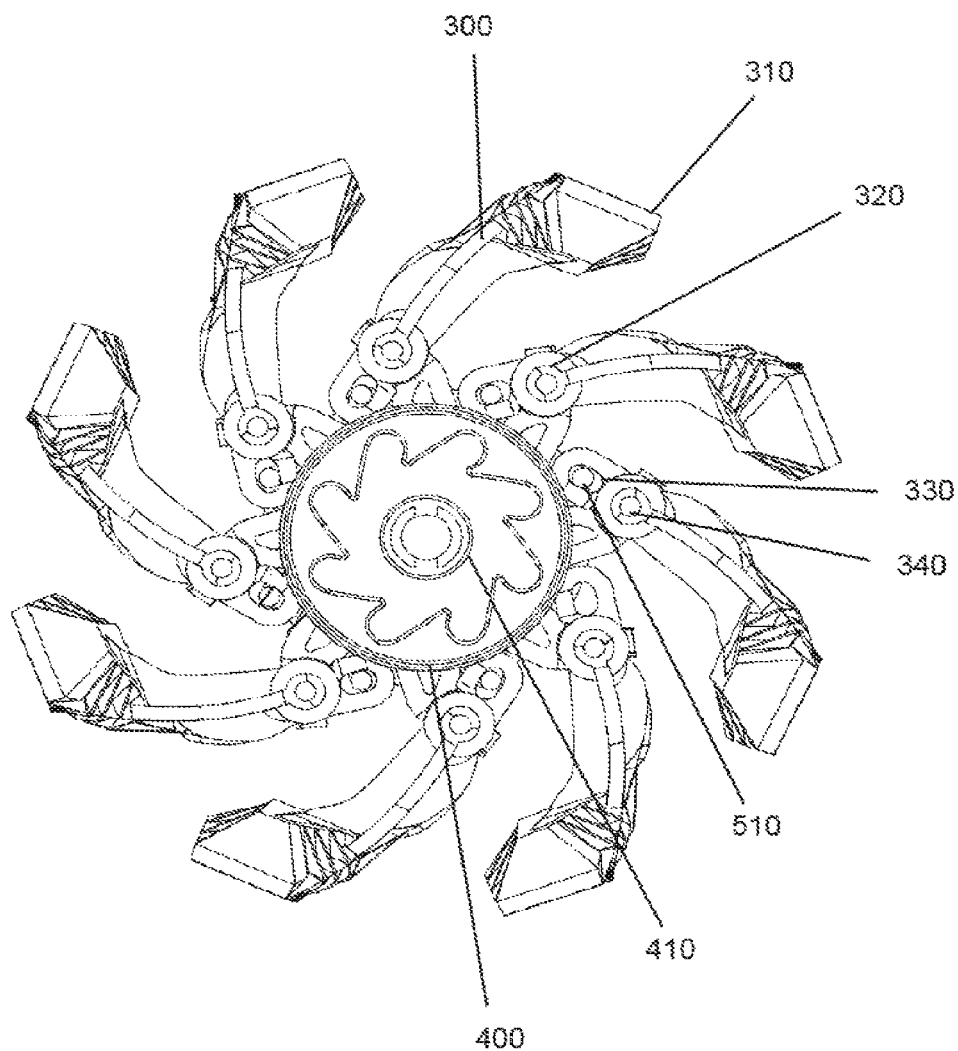
FIG. 2 is a side view of the inside an expandable wheel in the expanded position with sliding lever disc 400 attached in accordance with embodiments disclosed herein.
Figure 3:
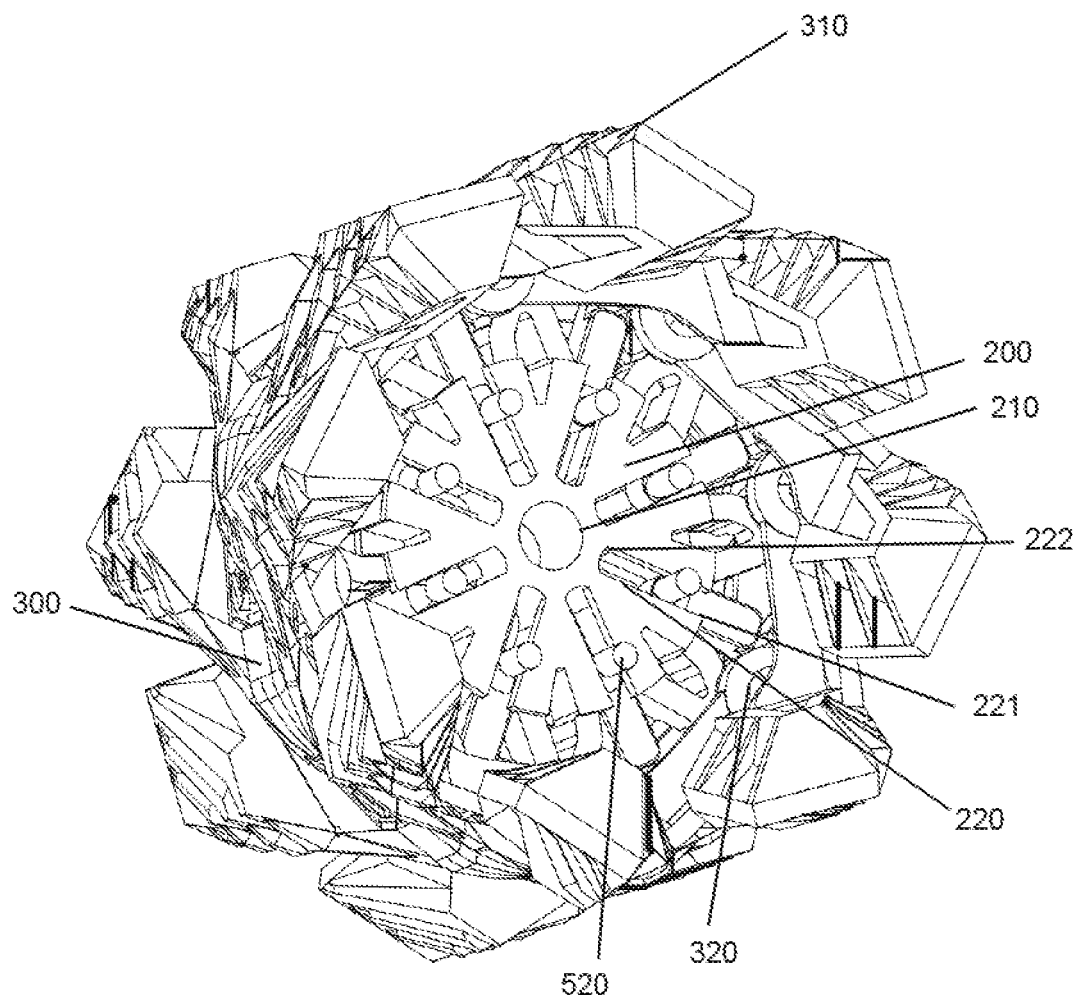
FIG. 3 is a perspective view of the inside of an expandable wheel in the contracted position without sliding lever disc 400 attached in accordance with embodiments disclosed herein.
Figure 4:
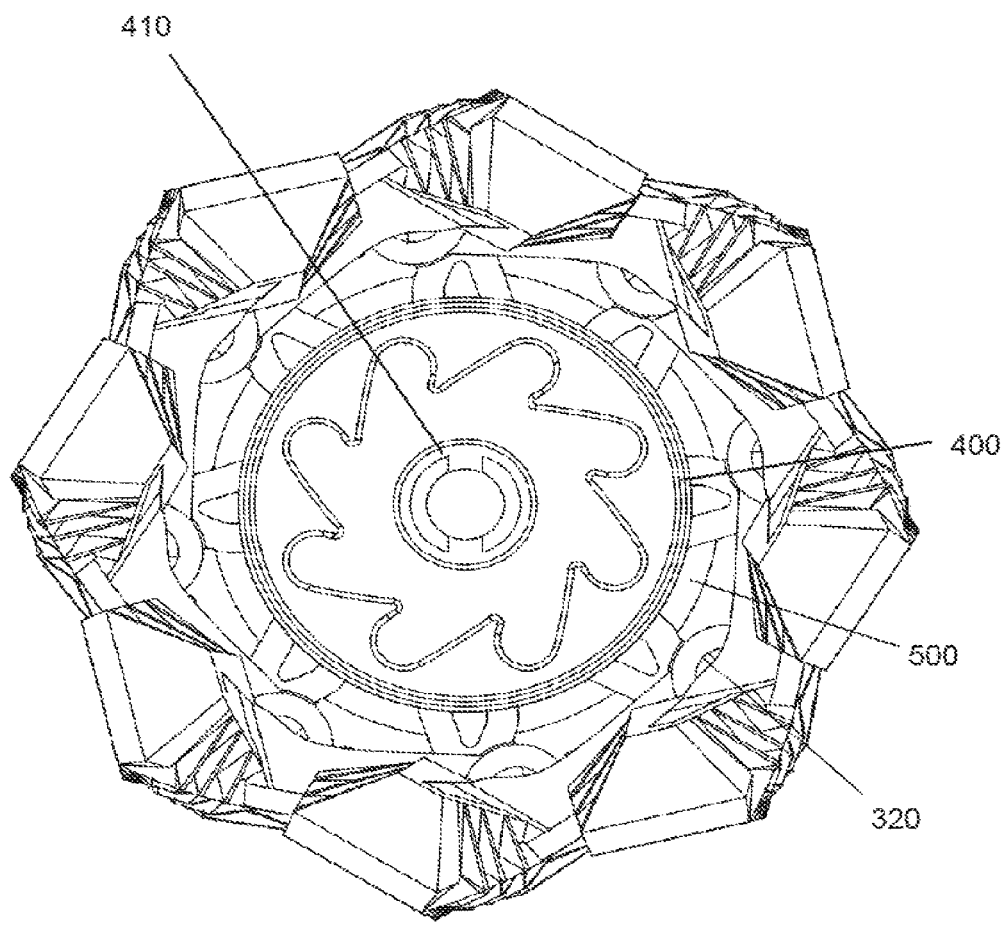
FIG. 4 is a side view of the inside an expandable wheel in the contracted position with sliding lever disc 400 attached in accordance with embodiments disclosed herein.
Figure 5:
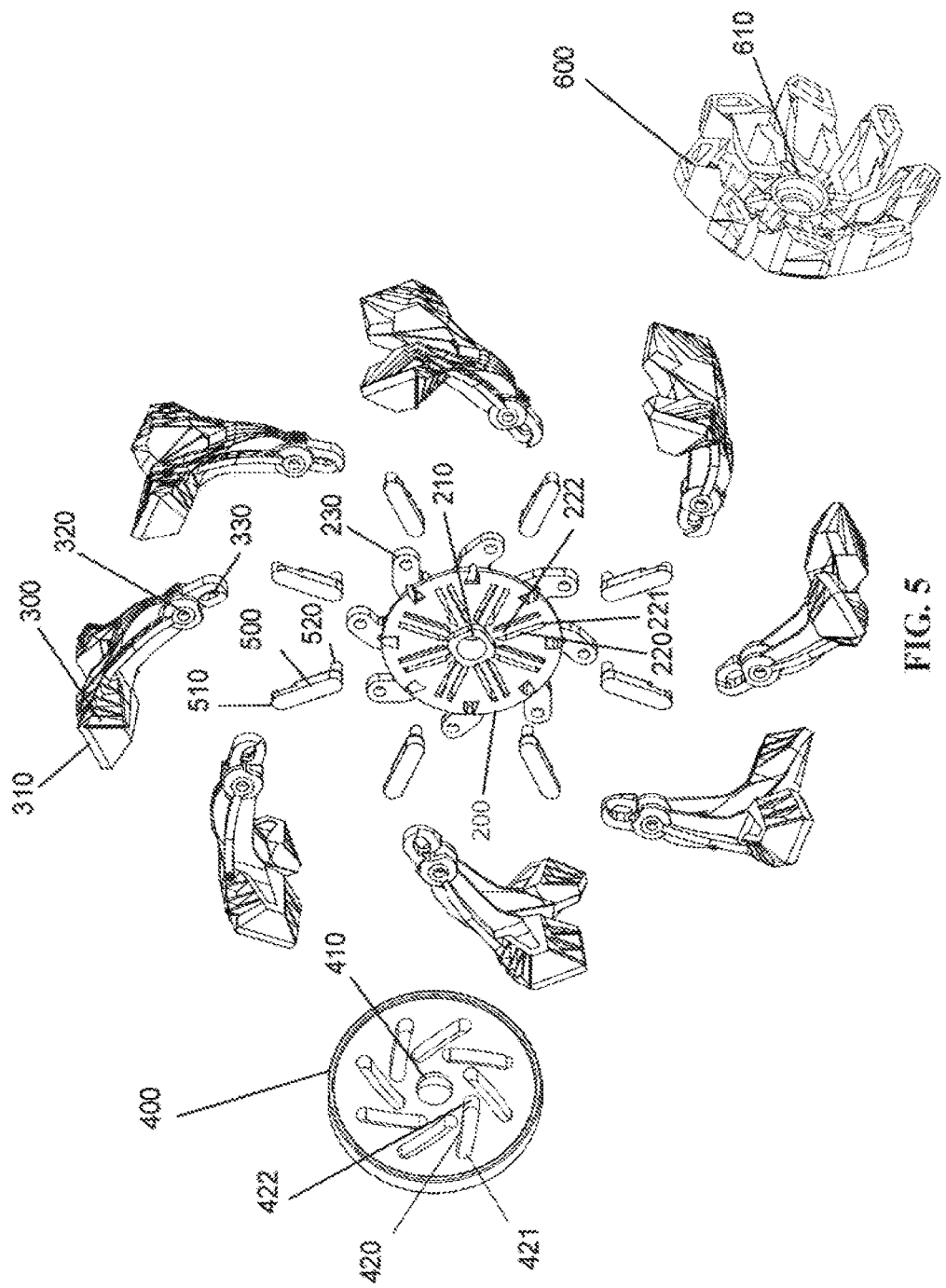
FIG. 5 is an exploded view of an expandable wheel and its components in accordance with embodiments disclosed herein.
Figure 6:
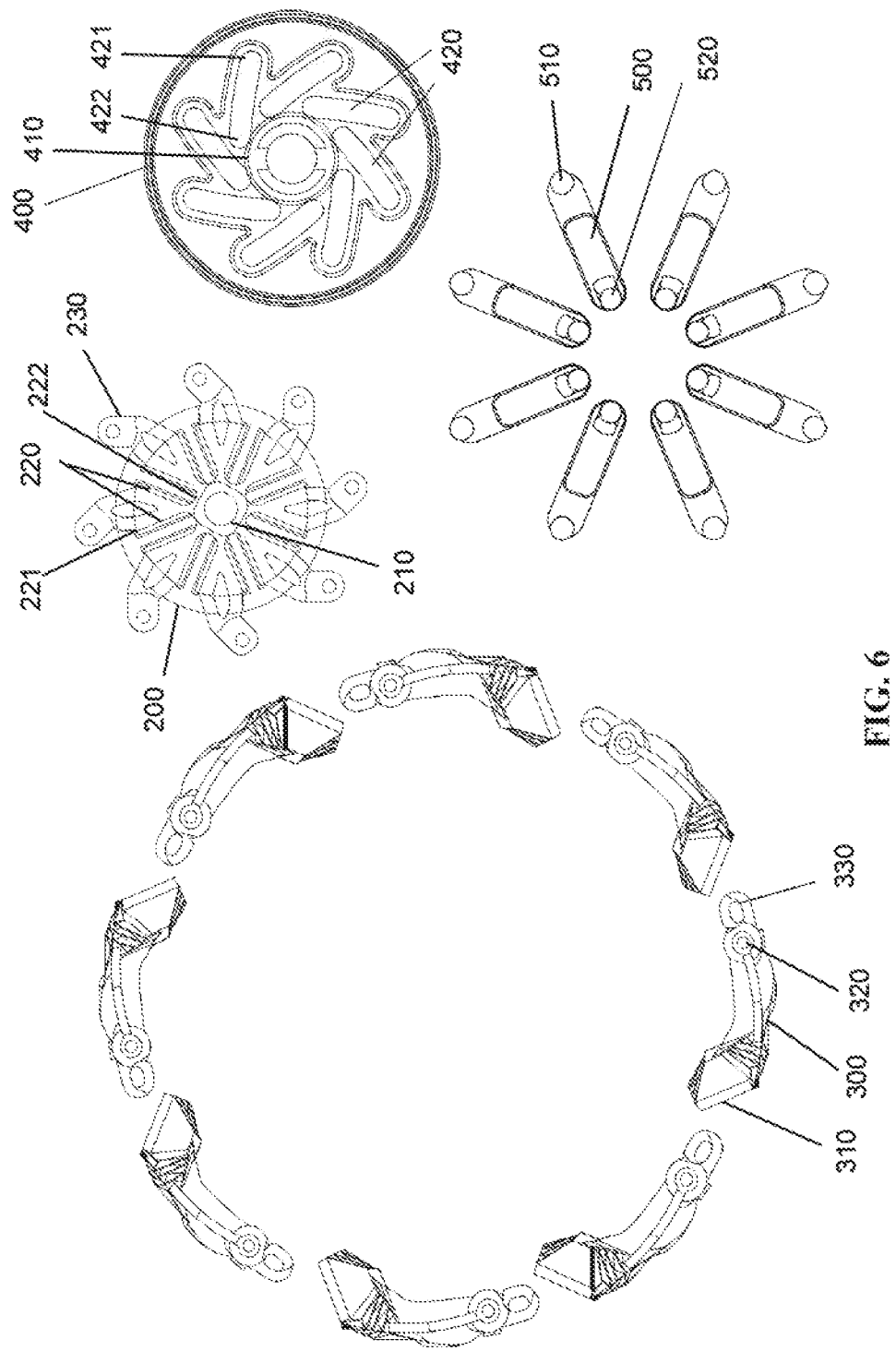
FIG. 6 is a side view of an expandable wheel components in accordance with embodiments disclosed herein.
Figure 7:
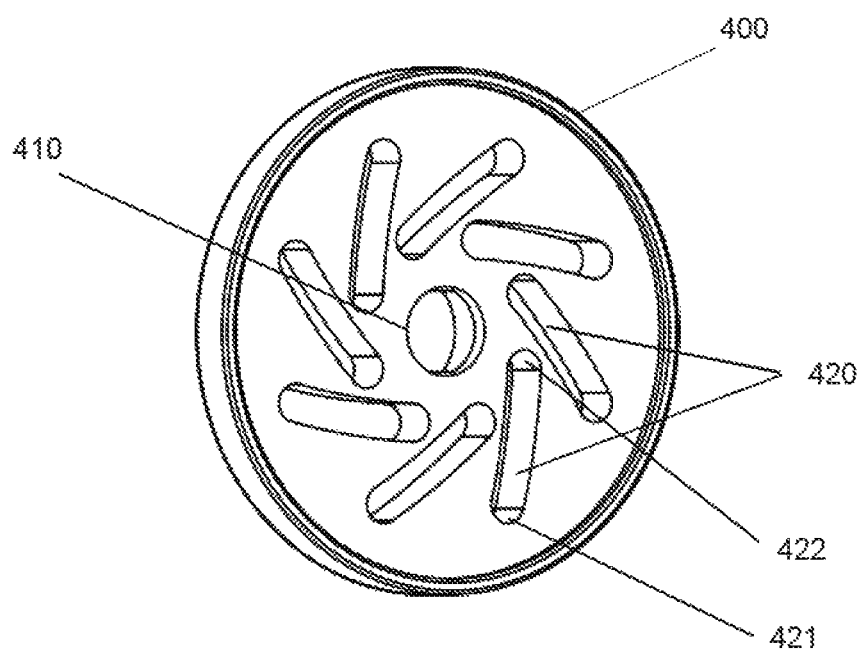
FIG. 7 is an inside-out perspective view of sliding lever disc 400 in accordance with embodiments disclosed herein.
Figure 8:
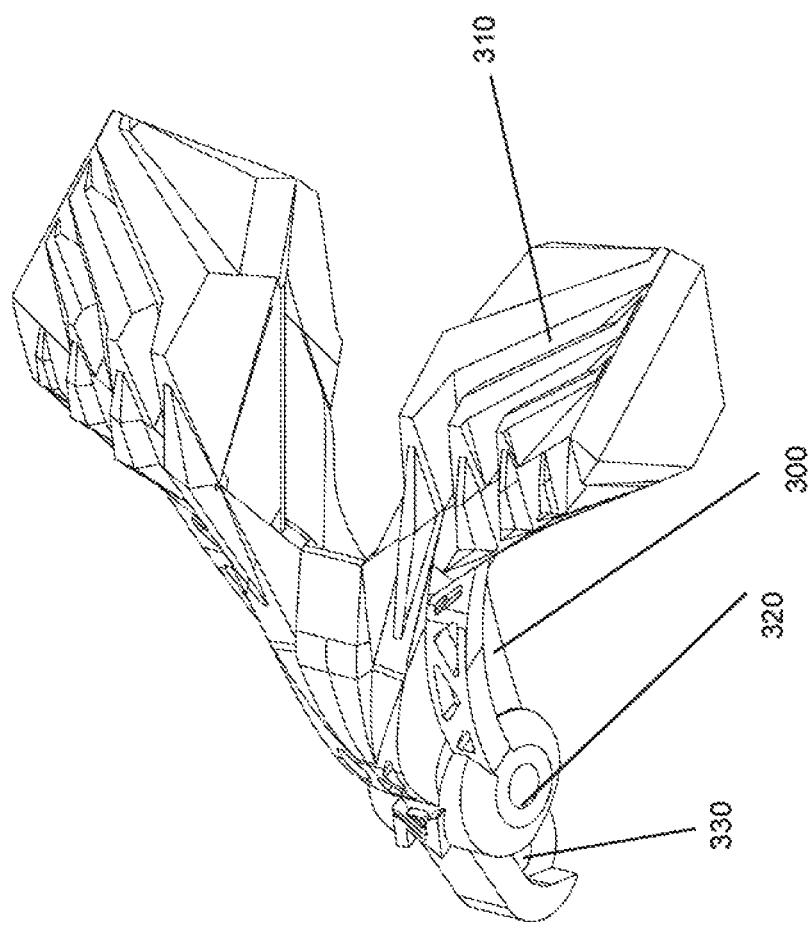
FIG. 8 is a perspective view of drive member 300 in accordance with embodiments disclosed herein.

In accordance with embodiments of the invention, as illustrated in FIGS. 1-10, an expandable wheel 100 is provided. FIGS. 1 and 2 illustrate an embodiment of the invention in an expanded position. FIGS. 3 and 4 illustrate an embodiment of the invention in a contracted position. FIG. 5 illustrates an exploded view of expandable wheel 100. As shown in FIGS. 1 and 5, the expandable wheel 100 includes a rim disc 200, a plurality of drive members 300 circumferentially and pivotally attached to rim disc 200, a sliding lever disc 400, a plurality of sliding levers 500, and a decorative rim outer frame 600. The rim disc 200 includes a rim disc central aperture 210. Rim disc channels 220 extend radially from the center of rim disc 200. Rim disc drive member connectors 230 are disposed on the outer circumference of rim disc 200. The drive member 300 includes drive member head 310, drive member pivot aperture 320, and drive member sliding lever aperture 330. The sliding lever disc 400 includes sliding lever disc central aperture 410. Sliding lever disc channels 420 extend at a radial angle from the center of sliding lever disc 400 to the outer circumference of sliding lever disc 400. Sliding lever 500 includes sliding lever drive pin 510 and sliding lever channel pin 520, each on opposing ends of sliding lever 500. Rim outer frame 600 includes rim outer frame central aperture 610.

When expandable wheel 100 is assembled, drive member pivot apertures 320 are pinned to rim disc drive member connectors 230 via drive member shafts 340. Drive members 300 are in a contracted position when expandable wheel 100 is at rest (FIGS. 3 and 4) and may pivot about drive member shafts 340 to an expanded position (FIGS. 1 and 2). In one embodiment, rim disc drive member connectors 230 are disposed at 45 degree increments radially from rim disc central aperture 210 as depicted in FIGS. 1, 3, 5 and 6. Sliding lever 500 is pivotally attached to drive member sliding lever aperture 330 via sliding lever drive pin 510. Sliding lever 500 is also slidably attached to rim disc 200 as sliding lever channel pin 520 is inserted into rim disc channel 220. Sliding lever 500 is operable to rotate drive member 300 about rim disc drive member connectors 230 when sliding lever channel pin 520 slides from rim disc channel drive end 221 to rim disc channel axle end 222, thereby pulling drive member sliding lever aperture toward rim disc channel axle end 222, and causing drive member head to rotate outward form the center of expandable wheel 100 (FIGS. 1 and 2).

Sliding lever disc channels 420 receive sliding lever channel pins 520 when sliding lever disc 400 is concentrically placed against rim disc 200 such that sliding lever disc central aperture 410 and sim disc central aperture 210 are generally aligned. When clockwise moment force is applied to sliding lever disc 400, sliding lever channel pin 520 slides from sliding lever disc channel outer end 421 to sliding lever disc channel inner end 422. As clockwise moment force is continually applied to sliding lever disc 400, sliding lever channel pin 520 is forced to slide from rim disc channel drive end 221 to rim disc channel axle end 222. Consequently, drive member 300 pivots about drive member shaft 340 and drive member head 310 rotates outward, thereby opening expandable wheel 100.

Figure 9:
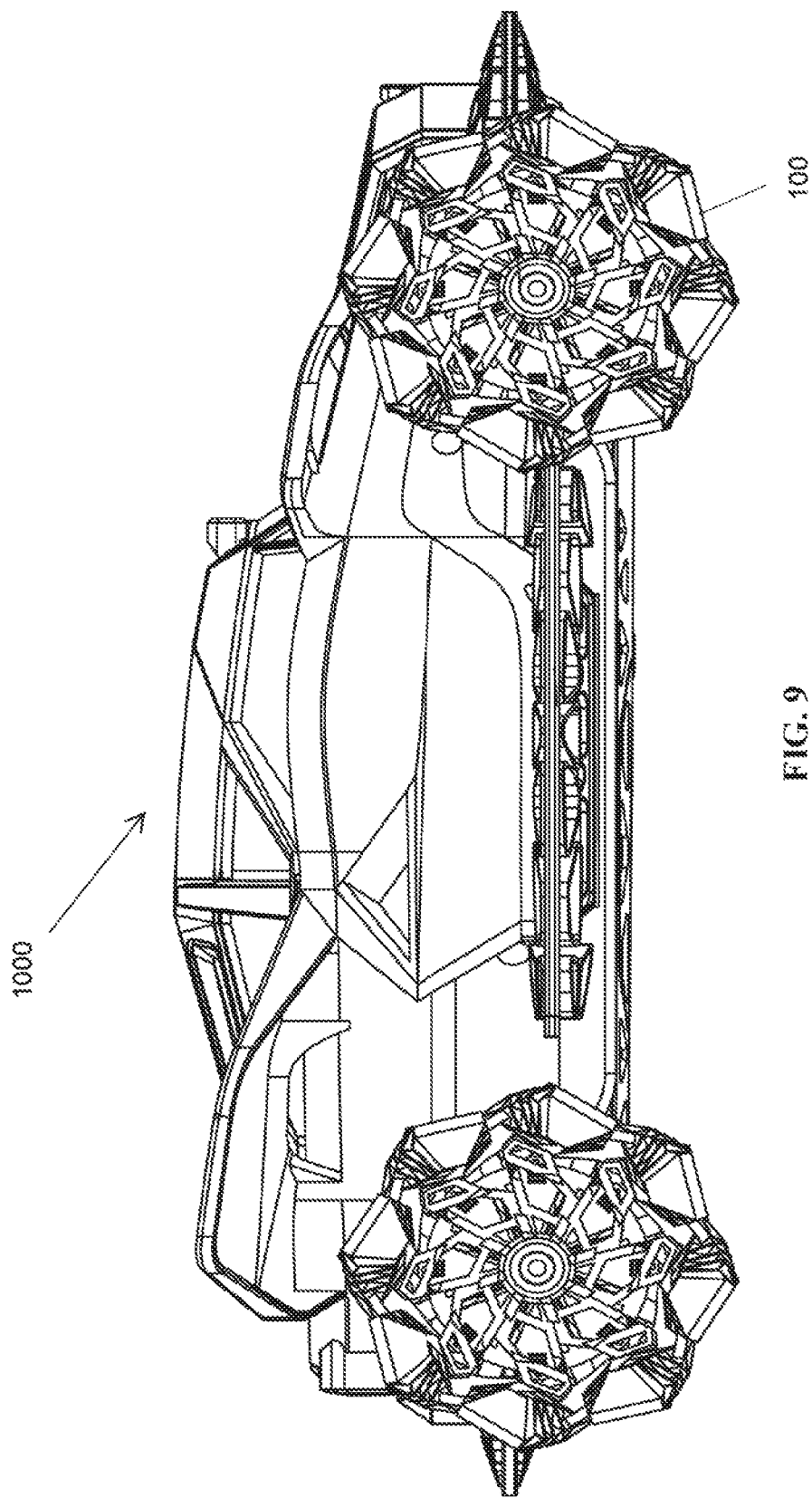
FIG. 9 is a side view of vehicle 1000 in accordance with embodiments disclosed herein.
Figure 10:
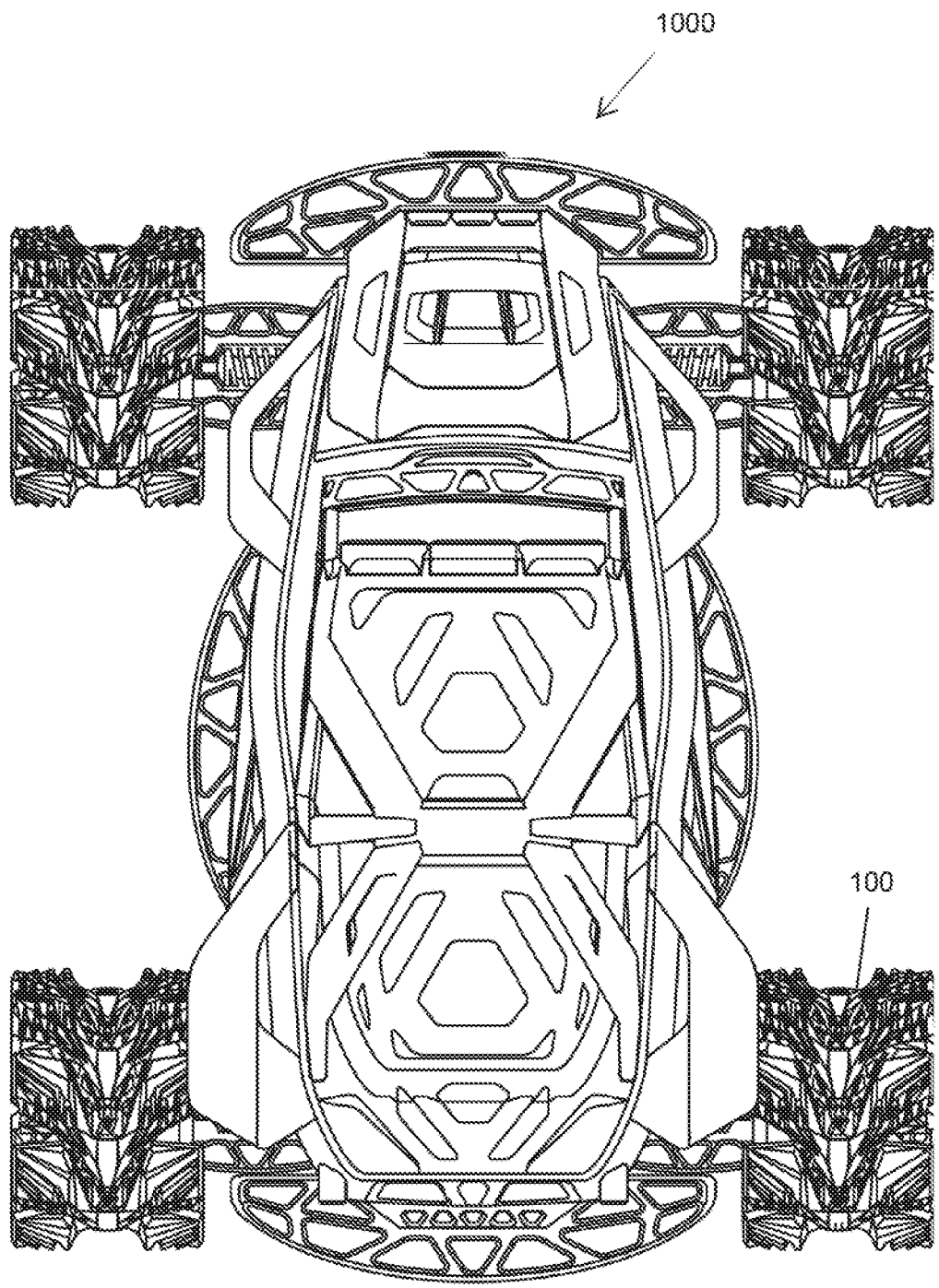
FIG. 10 is a top view of vehicle 1000 in accordance with embodiments disclosed herein.

In a preferred embodiment, expandable wheel 100 is attached to vehicle 1000 as depicted in FIGS. 9 and 10. As with a typical vehicle, an axle is attached to a drive system within vehicle 1000 and also attached to expandable wheels 100 such that when the drive system operates, the axle is operable to turn expandable wheel 100 and propel vehicle 1000 forward or backward. Specifically, the axle is inserted through sliding lever disc central aperture 410, through rim disc central aperture 210, through decorative rim outer frame central aperture 610, and is operable to rotate these components in unison in a forward or rearward direction. As a result, expandable wheel 100 rotates and propels vehicle 1000 forward or rearward when the axle turns.

When vehicle 1000 is at rest, drive members 300 are in the contracted position as shown in FIGS. 3 and 4 due to gravitational force. The mass of vehicle 1000 forces drive member head 310 toward the contracted position as show in FIGS. 3, 4, 9 and 10. In the resting, contracted position, sliding lever channel pin 520 rests within sliding lever disc channel outer end 421 and rim disc channel drive end 221 (FIGS. 3 and 4).

When the axle begins to rotate in a clockwise (forward) direction, it imparts a clockwise moment force upon sliding lever disc 400 which moves it in a clockwise direction. Sliding lever channel pins 520 slide from sliding lever disc channel outer ends 421 to sliding lever disc channel inner ends 422. When sliding lever channel pins 520 reach sliding lever disc channel inner ends 422, the continued moment force then slides sliding lever channel pins 520 from rim disc channel drive ends 221 toward rim disc channel axle ends 222. Consequently, sliding lever drive pins 510 pull drive member sliding lever apertures 330 toward the center of expandable wheel 100, which forces drive members 300 to pivot about drive member pivot apertures 320, thereby rotating drive member heads 310 outward. Drive member heads 310 propel vehicle 1000 forward due to continued applied moment force and friction between drive member heads 310 and the terrain. Moreover, expansion of drive members 300 lifts vehicle 1000 creating ground clearance, which is intended to allow vehicle 1000 to clear rugged terrain without bottoming out.

When the axle begins to rotate in a counter-clockwise (rearward) direction, it imparts a counter-clockwise moment force upon sliding lever disc 400 which moves it in a counter-clockwise direction. Sliding lever channel pins 520 slide from sliding lever disc channel inner ends 422 to sliding lever disc channel outer ends 421. When sliding lever channel pins 520 reach sliding lever disc channel outer ends 421, the continued moment force then slides sliding lever channel pins 520 from rim disc channel axle ends 222 toward rim disc channel drive ends 221. Consequently, sliding lever drive pins 510 push drive member sliding lever apertures 330 outward from the center of expandable wheel 100, which forces drive members 300 to pivot about drive member pivot apertures 320, thereby rotating drive member heads 310 inward. Drive member heads 310 propel vehicle 1000 rearward due to continued applied moment force and friction between drive member heads 310 and the terrain.

It is contemplated that drive members 300 may comprise any number of shapes, such as claws, spiked members, animal paws or hooves, or liquid propulsion members such as paddlewheels. It is also contemplated that a wheel operable to enable lateral movement may be disposed at drive member heads 310, thereby allowing vehicle 1000 to laterally rotate or "drift" as it turns while moving forward or in reverse.

For the purposes of promoting an understanding of the principles of the invention, reference has been made to the preferred embodiments illustrated in the drawings, and specific language has been used to describe these embodiments. However, this specific language intends no limitation of the scope of the invention, and the invention should be construed to encompass all embodiments that would normally occur to one of ordinary skill in the art. The particular implementations shown and described herein are illustrative examples of the invention and are not intended to otherwise limit the scope of the invention in any way. For the sake of brevity, conventional aspects of the system (and components of the individual operating components of the system) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. An expandable wheel, comprising:
a rim disc, said rim disc defining a plurality of rim disc channels, said rim disc channels having axle ends opposite drive ends;
a plurality of drive member connectors disposed around an outer circumference of said rim disc;
a plurality of drive members defining a plurality of drive member pivot apertures, said plurality of drive member pivot apertures operable to receive a plurality of drive member shafts,
said plurality of drive member shafts disposed within said drive member pivot apertures and said drive member connectors, thereby pivotally connecting said plurality of drive members to said plurality of drive member connectors;
a sliding lever disc, said sliding lever disc defining a plurality of sliding lever channels, said sliding lever channels having axle ends opposite drive ends; and
a plurality of sliding levers, said plurality of sliding levers having sliding ends opposite drive member ends, said plurality of sliding levers defining sliding lever channel pins at said sliding ends of said sliding levers, said sliding lever channel pins disposed within said rim disc channels and said sliding lever channels,
wherein said sliding ends of said plurality of sliding levers are positioned at said drive ends of said rim disc channels and sliding lever channels, and upon receipt of a rotational force applied to said sliding lever disc, said sliding ends of said plurality of sliding levers travel from said drive ends of said rim disc channels and sliding lever channels to said axle ends of said rim disc channels and sliding lever channels to pivot said drive members to move from a contracted position to an expanded position.

2. The expandable wheel of claim 1, wherein said rim disc further defines a central aperture operable to receive an axle, said rim disc operable to rotate about said axle disposed within said central aperture.

3. The expandable wheel of claim 1, wherein said plurality of drive members have connector ends opposite head ends, said plurality of drive members defining sliding member drive pin apertures operable to receive sliding member drive pins of sliding levers.

4. The expandable wheel of claim 1, wherein said sliding lever disc further defines a central aperture operable to receive an axle, said sliding lever disc operable to rotate about said axle disposed within said central aperture.

5. The expandable wheel of claim 1, said plurality of sliding levers further defining a sliding member drive pins at each of said drive member ends of said sliding levers, wherein said sliding drive member pins are disposed within said drive pin apertures of said plurality of drive members.

6. The expandable wheel of claim 1, wherein said drive members are claws.

7. The expandable wheel of claim 1, further comprising a rim outer frame, said rim outer frame defining a central aperture operable to receive an axle, said rim outer frame operable to rotate about said axle disposed within said central aperture.

8. The expandable wheel of claim 1, wherein said drive member connectors are radially disposed at 45 degree increments around the circumference of said rim disc.

9. A vehicle with at least one expandable wheel, said expandable wheel comprising:
a rim disc, said rim disc defining a central aperture operable to receive an axle, said rim disc operable to rotate about said axle disposed within said central aperture, said rim disc further defining a plurality of rim disc channels, said rim disc channels having axle ends opposite drive ends;
a plurality of drive member connectors disposed around an outer circumference of said rim disc, said plurality of drive member connectors defining a plurality of drive member pivot apertures, said plurality of drive member pivot apertures operable to receive a plurality of drive member shafts;
said plurality of drive member shafts disposed within said drive member pivot apertures;
a plurality of drive members pivotally connected to said plurality of drive member shafts, said plurality of drive members having connector ends opposite head ends, said plurality of drive members defining sliding member drive pin apertures operable to receive sliding member drive pins of sliding levers;
a sliding lever disc, said sliding lever disc defining a central aperture operable to receive said axle, said sliding lever disc operable to rotate about said axle disposed within said central aperture, said sliding lever disc defining a plurality of sliding lever channels, said sliding lever channels having axle ends opposite drive ends; and
a plurality of sliding levers, said plurality of sliding levers having sliding ends opposite drive member ends, said plurality of sliding levers defining sliding lever channel pins at said sliding ends of said sliding levers, said sliding lever channel pins disposed within said rim disc channels and said sliding lever channels, said plurality of sliding levers each defining a sliding member drive pin at each of said drive member ends of said sliding levers, said sliding drive member pins disposed within said drive pin apertures of said plurality of drive members,
wherein said sliding ends of said plurality of sliding levers are positioned at said drive ends of said rim disc channels and sliding lever channels, and upon receipt of a rotational force applied to said sliding lever disc, said sliding ends of said plurality of sliding levers travel from said drive ends of said rim disc channels and sliding lever channels to said axle ends of said rim disc channels and sliding lever channels to pivot said drive members to move from a contracted position to an expanded position.

10. The vehicle with at least one expandable wheel of claim 9, further comprising a means of imparting force on said expandable wheel to propel said vehicle.

11. The vehicle with at least one expandable wheel of claim 9, wherein said drive members are claws.

12. The vehicle with at least one expandable wheel of claim 9, further comprising a rim outer frame, said rim outer frame defining a central aperture operable to receive an axle, said rim outer frame operable to rotate about said axle disposed within said central aperture.

13. The vehicle with at least one expandable wheel of claim 9, wherein said drive member connectors are radially disposed at 45 degree increments around the circumference of said rim disc.

\* \* \* \* \*